May 14, 1957　　　W. E. SCHOBER　　　2,792,230
NIPPLE CHUCK
Filed March 9, 1955　　　　　　　　　2 Sheets-Sheet 1
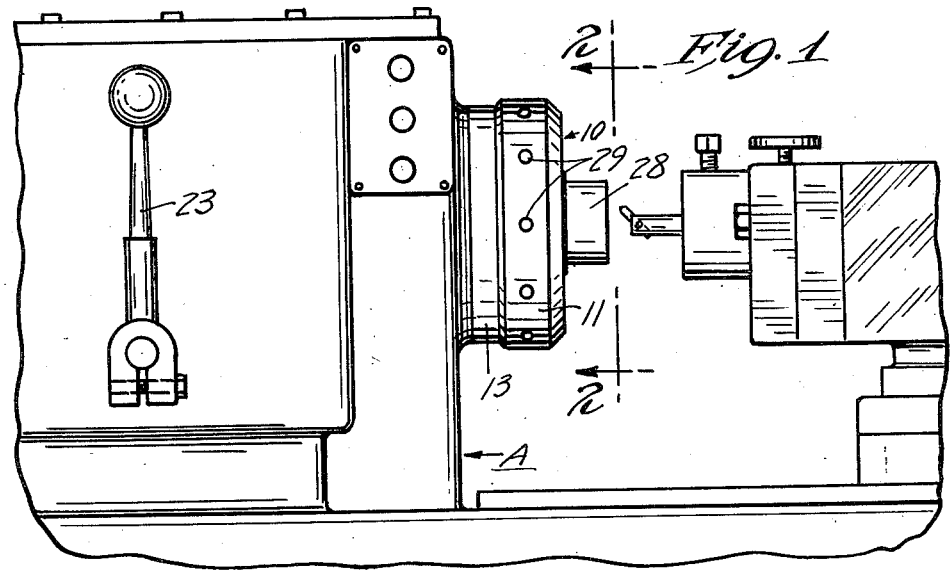
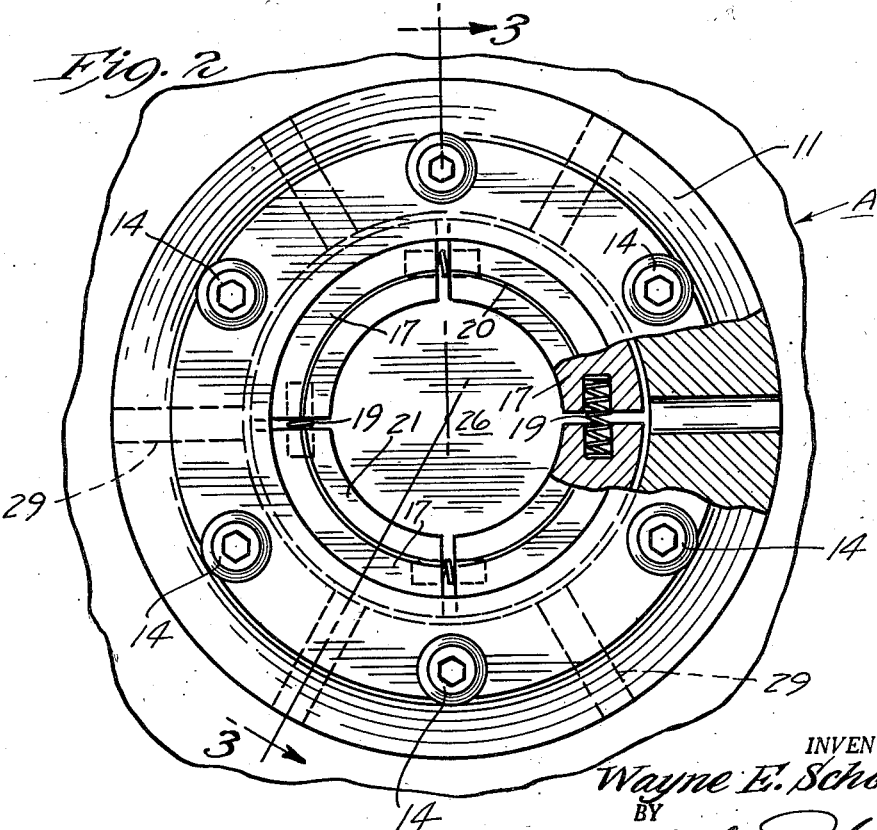
INVENTOR.
Wayne E. Schober
BY
Merchant & Merchant
ATTORNEYS

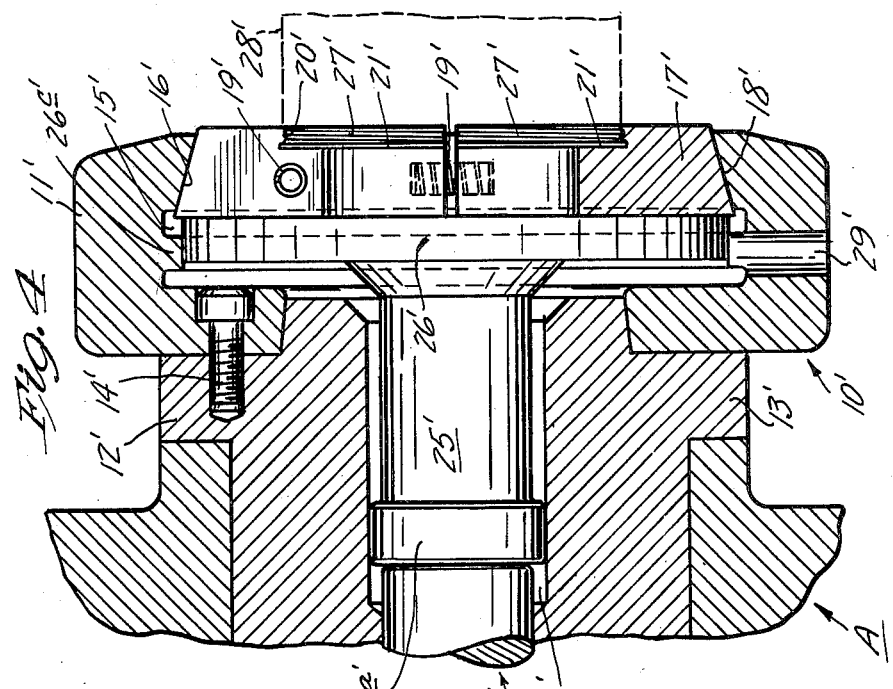
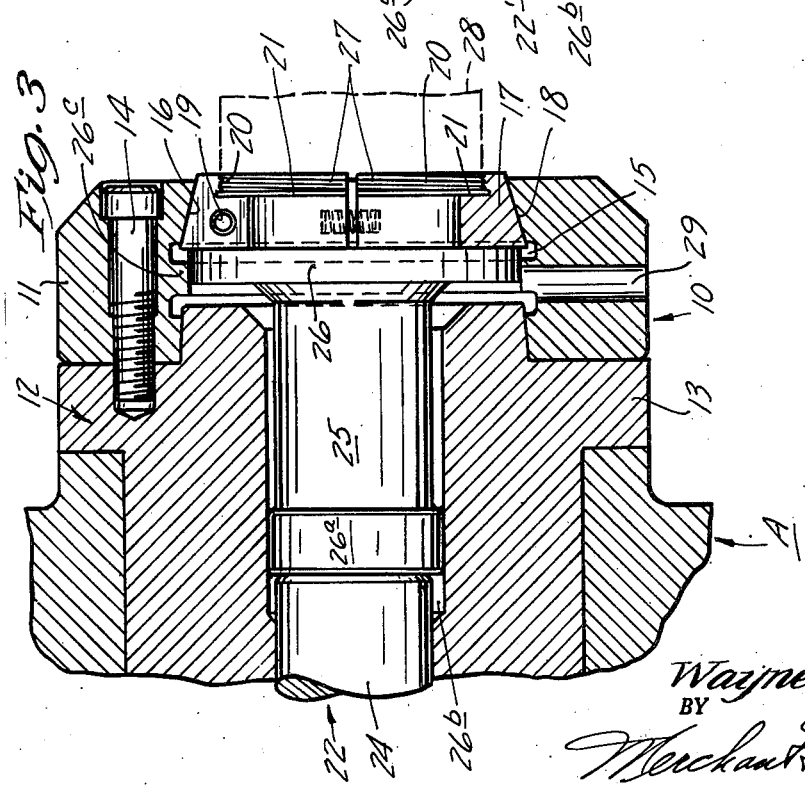

United States Patent Office 2,792,230
Patented May 14, 1957

2,792,230
NIPPLE CHUCK

Wayne E. Schober, Minneapolis, Minn., assignor to Peter A. Rasmussen, Minneapolis, Minn., doing business as Viking Tool and Die Company, Minneapolis, Minn.

Application March 9, 1955, Serial No. 493,138

2 Claims. (Cl. 279—7)

My invention relates to improvements in a lathe chuck.

An object of my invention is to provide a novel and improved chuck which grips a minimum of stock and yet provides a secure support for the work which will not give or yield under work strain.

Another object of my invention is to provide, in a novel and improved lathe chuck, a housing adapted to be secured to the spindle nose of a lathe which defines an internal axially outwardly tapering seat which acts to cam several generally arcuate-shaped circumferentially disposed work engaging jaws, having tapering outer surfaces corresponding to the taper of the seat, between work holding and work releasing positions when the jaws are moved axially with respect to the seat; the jaws are of hardened material and are of a length generally approximating the length of the seat and the jaws, in their work holding position, extend axially outwardly a maximum of only slightly beyond the outward limit of the housing to be almost totally enclosed thereby so that there is no give or yielding of the jaws under work strain.

The jaws of my novel and improved lathe chuck, generally defined in the afore-mentioned object, form circumferentially disposed cylindrically-segmental work engaging surfaces and abutment shoulders extending radially inwardly from the inner limits of the work engaging surfaces, and it is a further object of my invention to provide these work engaging surfaces with internal threads which tend to feed the work during the cutting thereof into abutment with said shoulders.

These and other objects and advantages of my novel and improved lathe chuck will be apparent from the following specification and claims, reference being had to the accompanying drawings wherein:

Fig. 1 is a view in side elevation showing my novel and improved lathe chuck in operative position on a lathe;

Fig. 2 is an enlarged fragmentary view in elevation taken substantially on the line 2—2 of Fig. 1 with some parts broken away;

Fig. 3 is a fragmentary view in vertical section taken substantially on the line 3—3 of Fig. 2; and Fig. 4 is a second modification of my novel and improved lathe chuck which view corresponds generally to the view of the modification shown in Fig. 3.

Referring more particularly to the drawings, my novel and improved lathe chuck, indicated by the numeral 10, comprises a housing or hood 11 which is secured to the spindle nose 12 of a lathe, indicated in its entirety by the letter A. In the modification shown in Fig. 3, housing or hood 11 has an outer diameter which is approximately equal to the outer diameter of the flange 13 of the spindle nose 12 and it is secured thereto by external bolts 14. Housing 11 defines a jaw-receiving cavity 15 bounded in part by a conical, axially outwardly tapering, cam-acting seat 16 which is formed by the housing 11. Several generally arcuate-shaped circumferentially disposed jaws 17, and as seen in Fig. 2 there are preferably four of them, have tapering outer surfaces 18 corresponding to the taper of seat 16 and are biased radially outwardly into engagement with the seat 16 by means comprising circumferentially disposed compression springs 19 between adjacent jaws.

Jaws 17 define circumferentially disposed cylindrically segmental work engaging surfaces 20 and abutment shoulders 21 which extend radially inwardly from the inner limits of the work engaging surfaces 20. Cam-acting seat 16 acts to move the jaws 17 radially parallel to the spindle axis between work holding and work releasing positions when the jaws 17 are moved axially with respect thereto. Means are provided for moving the jaws 17 axially with respect to seat 16 and for maintaining the work holding position of the jaws 17 until released. This means, indicated in its entirety by the numeral 22, comprises, generally, a chuck operating lever 23 which is adapted to controllably move a pushout rod 24, carried by the lathe spindle in coaxial relationship therewith, longitudinally in opposite direction. Pushout rod 24 is adapted to move a jaw-closing actuator 25 terminating in a closure plate 26 which is disposed within the cavity 15 and which engages the jaws 17 to move them axially outwardly into work holding position. Closure plate 26 maintains the jaws 17 in their work holding position until chuck operating lever 23 is actuated to move pushout rod 24 longitudinally or axially inwardly.

Jaw-closing actuator 25 is supported for true axial movement by an annular collar 26a formed therewith, which is supported for axial movement within the bore 26b formed in spindle nose 12, and by the mounting of closure plate 26, which is supported for axial movement by an annular internal boss 26c formed by the housing 11 and projecting into the cavity 15 axially inwardly spaced from the seat 16. Providing a support for actuator 25 at its opposite ends by the mounting of collar 26a and closure plate 26 insures a stable and sturdy support therefor and insures a true axial movement thereof when actuated by pushout rod 24, so that closure plate 26 properly engages jaws 17 to provide uniformity in the closing thereof.

The jaws 17 are each of a length which generally approximates the length of seat 16, and at their work holding position the jaws 17 extend axially outwardly a maximum of only slightly beyond the outward limit of the housing 11, so that the housing 11 almost totally encloses the jaws 17 to prevent any give or yielding thereof under work strain. Preferably, jaws 17 extend axially outwardly from the housing 11 a distance of only one-sixteenth of an inch to provide a tool or a work clearance. Jaws 17 may be formed of hardened material and as previously mentioned are movable parallel to the spindle axis to and from their work holding position, which factors eliminate important disadvantages of collet chucks now known. As particularly seen in Fig. 3, work engaging surfaces 20 are provided with internal threads 27 which tend to feed the work or stock 28 engaged thereby toward the abutment 21 during the cutting of stock 28. Work engaging surfaces 20 are adapted to grip a minimum amount of the work or stock 28, generally about one-eighth of an inch, and yet jaws 17 provide a secure support which will not give or yield under work strain because of the fact that housing 11 almost entirely encloses the jaws 17.

I further provide circumferentially spaced passages or holes 29 which are formed in housing 11 axially inwardly spaced from seat 16 and which extend radially outwardly from the cavity 15. Holes 29 are adapted to dispose of any extraneous matter or material which might find its way into the chuck 10.

Referring to the modification of my invention shown in Fig. 4, the parts thereof will be indicated by the same numerals as used with respect to like parts in the modification of Fig. 3 with the addition of a distinguishing prime mark. Chuck 10' is primarily distinguished over chuck 10 insofar as the outer and inner diameters of housing 11' are greater than the diameters of housing 11 to provide for a larger jaw-receiving cavity 15', and housing 11' is connected to the spindle nose 12' by internal bolts 14'. Closure plate 26' is likewise of a larger diameter than closure plate 26. Chuck 10' is adapted for larger jaws 17' which may support work 28' of larger diameter than the jaws 17 of chuck 10' and yet chuck 10' is adapted to be secured to a spindle nose of the same size as is chuck 10.

My invention has been built and tested and found to accomplish all of the afore-mentioned objectives and has been found to be a commercially practical, effective and improved lathe chuck. It will be obvious to those skilled in the art that my invention may be modified in many substitutions and equivalents and that this disclosure is intended to be illustrative only. Therefore, I intend to be limited solely by the scope of the appended claims.

What I claim is:

1. A lathe chuck comprising a housing adapted to be secured to the spindle nose of a lathe and defining a central jaw-receiving cavity, a conical axially outwardly tapering cam-acting seat formed by said housing and bounding said cavity, several generally arcuate-shaped circumferentially disposed jaws having tapering outer surfaces corresponding to the taper of said seat mounted in said cavity, means yieldably biasing said jaws radially outwardly into engagement with said seat, said jaws being radially movable between a work holding and work releasing position by said cam-acting seat when moved axially with respect thereto, and means for moving said jaws axially with respect to said seat and for maintaining the work holding position of said jaws until released, said jaws defining circumferentially disposed cylindrically-segmental work engaging surfaces and abutment shoulders extending radially inwardly from the inner limits of said work engaging surfaces, said work engaging surfaces being internally threaded whereby said threads tend to feed the work during the cutting thereof into abutment with said shoulders, said jaws being of a length generally approximating the length of said seat and at their work holding position extending axially outwardly a maximum of only slightly beyond the outward limit of said housing to be almost totally enclosed by said housing, whereby there is no give or yielding of the jaws under work strain.

2. A lathe chuck comprising a housing adapted to be secured to the spindle nose of a lathe and defining a central jaw receiving cavity bounded by a conical axially outwardly tapering cam acting seat, four like arcuate shaped circumferentially disposed jaws having tapering outer surfaces corresponding to the taper of said seat mounted in said cavity, each of said jaws extending approximately but slightly less than 90° of circular arc and each having an outwardly opening aperture formed therein at each of its ends, four circumferentially disposed compression springs mounted between adjacent jaws in said apertures for yieldably biasing said jaws radially outwardly into engagement with said seat, said jaws being radially movable between a work holding and work releasing position by said cam-acting seat when moved axially with respect thereto, and means for moving said jaws axially with respect to said seat and for maintaining the work holding position of said jaws until released, said jaws defining circumferentially disposed cylindrically segmental work engaging surfaces and abutment shoulders extending radially inwardly from the inner limits of said work engaging surfaces, said work engaging surfaces being internally threaded whereby said threads tend to feed the work during the cutting thereof into abutment with said shoulders, said jaws being of a length generally approximating the length of said seat and at their work holding position extending axially outwardly a maximum of only slightly beyond the outward limit of said housing to be almost totally enclosed by said housing, whereby there is no give or yielding of the jaws under work strain.

References Cited in the file of this patent

UNITED STATES PATENTS 1,807,265    Walker      May 26, 1931

FOREIGN PATENTS 566,092    Great Britain      Dec. 13, 1944